US011099898B2

(12) United States Patent
Guo et al.

(10) Patent No.: US 11,099,898 B2
(45) Date of Patent: Aug. 24, 2021

(54) METHOD FOR ALLOCATING MEMORY RESOURCES AND TERMINAL DEVICE

(71) Applicant: Guangdong Oppo Mobile Telecommunications Corp., Ltd., Guangdong (CN)

(72) Inventors: Ziqing Guo, Guangdong (CN); Haitao Zhou, Guangdong (CN); Lizhong Wang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 109 days.

(21) Appl. No.: 16/584,177

(22) Filed: Sep. 26, 2019

(65) Prior Publication Data

US 2020/0019441 A1 Jan. 16, 2020

Related U.S. Application Data

(63) Continuation of application No. PCT/CN2017/103528, filed on Sep. 26, 2017.

(30) Foreign Application Priority Data

Apr. 10, 2017 (CN) .......................... 201710230248.0

(51) Int. Cl.
*G06F 9/46* (2006.01)
*G06F 9/50* (2006.01)
*G06F 12/02* (2006.01)

(52) U.S. Cl.
CPC .......... *G06F 9/5016* (2013.01); *G06F 9/5033* (2013.01); *G06F 9/5044* (2013.01); *G06F 12/0238* (2013.01)

(58) Field of Classification Search
CPC .... G06F 9/5016; G06F 9/5033; G06F 9/5044; G06F 12/0238
See application file for complete search history.

(56) References Cited

U.S. PATENT DOCUMENTS

2008/0168325 A1 7/2008 Yoon

FOREIGN PATENT DOCUMENTS

| CN | 103701934 A | 4/2014 |
|---|---|---|
| CN | 104618269 A | 5/2015 |

(Continued)

OTHER PUBLICATIONS

Extended European search report issued in corresponding European application No. 17905150.3 dated Nov. 19, 2020.

(Continued)

*Primary Examiner* — Gregory A Kessler
(74) *Attorney, Agent, or Firm* — Young Basile Hanlon & MacFarlane, P.C.

(57) ABSTRACT

A method for allocating memory resources and a terminal device are provided. The method is applied to the terminal device. The terminal device includes a rich execution environment (REE) and a fingerprint trust application (TA). The method includes the following. In response to a request for memory resources from the fingerprint TA, the REE obtains N values of memory resources requested at N time points within a preset period by the fingerprint TA, where each of the N values of memory resources is in one-to-one correspondence with one of the N time points and N represents an integer larger than 1. The REE determines a target value of memory resources according to the N values of memory resources, and allocates memory resources equal in value to the target value of memory resources for the fingerprint TA.

20 Claims, 2 Drawing Sheets

(56) References Cited

FOREIGN PATENT DOCUMENTS

| CN | 104951372 A | 9/2015 |
|---|---|---|
| CN | 105893140 A | 8/2016 |
| EP | 3051426 A1 | 8/2016 |
| JP | 09198485 A | 7/1997 |

OTHER PUBLICATIONS

Sun He et al:"Reliable and Trustworthy Memory Acquisition on Smartphones", IEEE Transactions on Information Forensics and Security, IEEE, Piscataway, NJ, US, vol . 10, No. 12, Dec. 1, 2015 (Dec. 1, 2015), pp. 2547-2561, XP011670116, ISSN: 1556-6013, DOI:10.1109/TIFS.2015.2467356.

Jinsoo Jang et al:"SeCReT: Secure Channel between Rich Execution Environment and Trusted Execution Environment", Proceedings 2015 Network and DistributedSystem Security Symposium, Feb. 11, 2015 (Feb. 11, 2015), XP55640245, Reston, VA DOI: 10.14722/ndss.2015.23189 ISBN: 978-1-891562-38-9.

International search report issued in corresponding international application No. PCT/CN2017/103528 dated Jan. 11, 2018.

Examination report issued in corresponding European application No. 17905150.3 dated May 14, 2021.

First Examination report issued in corresponding IN application No. 201917042093 dated Mar. 24, 2021.

METHOD FOR ALLOCATING MEMORY RESOURCES AND TERMINAL DEVICE

CROSS-REFERENCE TO RELATED APPLICATION(S)

This application is a continuation of International Application No. PCT/CN2017/103528, filed on Sep. 26, 2017, which claims priority to Chinese Patent Application Serial No. 201710230248.0, filed on Apr. 10, 2017, the entire disclosures of both of which are hereby incorporated by reference.

TECHNICAL FIELD

This disclosure relates to the technical field of electronic technology, and particularly to a method for allocating memory resources and a terminal device.

BACKGROUND

An Android® system runs in a rich execution environment (REE), and some special programs having a high security level such as a fingerprint recognition application, a fingerprint payment application, an application for encryption and the like run in a trust execution environment (TEE). It can be seen that compared with the REE, a value of memory resources allocated for a program such as a trust application (TA) running in the TEE is limited. At present, memory resources are allocated for the TA randomly. In such a way, the value of memory resources allocated for the TA may be too large, resulting in a waste of memory resources, or the value of memory resources allocated for the TA may be too small, resulting in a crash of the TA. Therefore, how to allocate memory resources for the TA is a technical problem needed to be solved.

SUMMARY

Implementations of the present disclosure provide a method for allocating memory resources and a terminal device.

According to a first aspect, in the implementations of the present disclosure, a method for allocating memory resources is provided. The method is applied to a terminal device. The terminal device includes an REE and a fingerprint TA. The method includes the following. In response to a request for memory resources sent by the fingerprint TA, the REE obtains N values of memory resources requested at N time points within a preset period by the fingerprint TA, where each of the N values is in one-to-one correspondence with one of the N time points and N represents an integer larger than 1. The REE determines a target value of memory resources according to the N values of memory resources, and allocates memory resources equal in value to the target value of memory resources for the fingerprint TA.

According to a second aspect, in the implementations of the present disclosure, a terminal device is provided. The terminal device includes an REE and a fingerprint TA. The REE is configured to obtain, in response to a request for memory resources sent by the fingerprint TA, N values of memory resources requested at N time points within a preset period by the fingerprint TA, where each of the N values of memory resources is in one-to-one correspondence with one of the N time points and N represents an integer larger than 1. The REE is further configured to determine a target value of memory resources according to the N values of memory resources, and allocate memory resources equal in value to the target value of memory resources for the fingerprint TA.

According to a third aspect, in the implementations of the present disclosure, a terminal device is provided. The terminal device includes a processor. The processor is configured to enable the terminal device to execute corresponding functions of the method for allocating memory resources provided in the first aspect. The terminal device may further include a memory. The memory is coupled to a processor, and stores necessary program instructions and data of the terminal device. The terminal device may further include a transceiver configured to realize communication with the terminal device or other device or communication network.

According to a fourth aspect, a computer storage medium is provided in the present disclosure. The computer storage medium is configured to store computer software instructions used by the terminal device in the third aspect. The computer software instructions contain programs for executing the above method.

According to a fifth aspect, in the implementations of the present disclosure, a computer program product is provided. The computer program product includes a non-transitory computer-readable storage medium that stores computer programs. The computer programs are operable with a computer to execute part of or all operations described in the first aspect of the implementations of the present disclosure. The computer program product may be a software installation package. The computer may include the terminal device.

BRIEF DESCRIPTION OF THE DRAWINGS

To describe technical solutions of implementations of the present disclosure more clearly, the following will give a brief description of accompanying drawings used for describing the implementations of the present disclosure. Apparently, the accompanying drawings described in the following are merely some implementations of the present disclosure. Those of ordinary skill in the art can also obtain other accompanying drawings based on the accompanying drawings without creative efforts.

DETAILED DESCRIPTION

In order to enable those skilled in the art to better understand technical solutions of the present disclosure, the technical solutions embodied in implementations of the present disclosure will be described in a clear and comprehensive manner in conjunction with the accompanying drawings. It is apparent that the implementations described herein are merely some of rather than all the implementations of the present disclosure. Based on the implementations of the present disclosure, all other implementations obtained by those of ordinary skill in the art without creative efforts shall fall within the protection scope of the present disclosure.

The following will describe the implementations of the present disclosure in detail.

The terms "first", "second", "third", "fourth" and the like used in the specification, the claims, and the accompany drawings of the present disclosure are used to distinguish different objects rather than describe a particular order. In addition, the terms "include", "comprise", and "have" as well as variations thereof are intended to cover non-exclusive inclusion. For example, a process, method, system, product, or apparatus including a series of steps or units is not limited to the listed steps or units, on the contrary, it can optionally include other steps or units that are not listed; alternatively, other steps or units inherent to the process, method, product, or device can be included either.

The term "embodiment" or "implementation" referred to herein means that a particular feature, structure, or characteristics described in conjunction with the implementations may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

In an implementation, a method for allocating memory resources is provided. The method is applied to a terminal device. The terminal device includes an REE and a fingerprint TA. The method includes the following. In response to a request for memory resources sent by the fingerprint TA, the REE obtains N values of memory resources requested at each of N time points within a preset period by the fingerprint TA, where each of the N values of memory resources is in one-to-one correspondence with one of the N time points and N represents an integer larger than 1. The REE determines a target value of memory resources according to the N values of memory resources, and allocates memory resources equal in value to the target value of memory resources for the fingerprint TA.

In an implementation, a terminal device is provided. The terminal device includes an REE and a fingerprint TA. The REE is configured to obtain, in response to a request for memory resources from the fingerprint TA, N values of memory resources requested at N time points within a preset period by the fingerprint TA, where each of the N values of memory resources is in one-to-one correspondence with one of the N time points and N represents an integer larger than 1. The REE is further configured to determine a target value of memory resources according to the N values of memory resources, and allocate memory resources equal in value to the target value of memory resources for the fingerprint TA.

By means of the above solutions, the terminal device can flexibly allocate memory for the fingerprint TA, thereby increasing a usage rate of memory.

The following will describe the implementations of the present disclosure in conjunction with the accompanying drawings.

Figure 1:
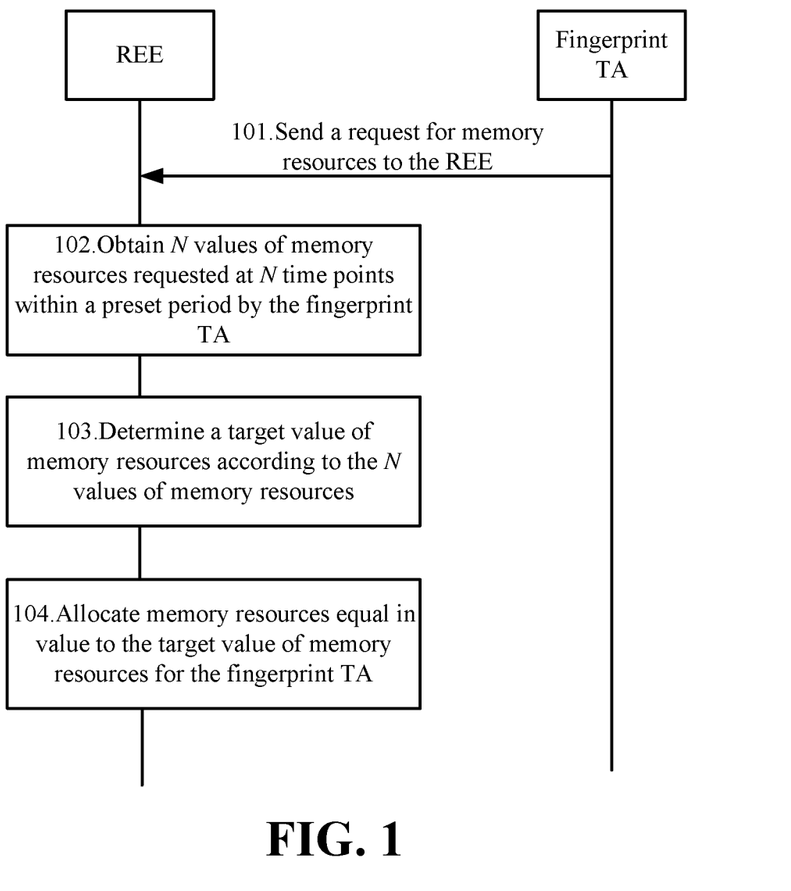
FIG. 1 is a schematic flow chart illustrating a method for allocating memory resources according to an implementation of the present disclosure.

FIG. 1 is a schematic flow chart illustrating a method for allocating memory resources according to an implementation of the present disclosure. The method is applied to a terminal device. The terminal device includes an REE and a fingerprint TA. The method includes the following.

At block 101, the fingerprint TA sends a request for memory resources to the REE.

The terminal device, also referred to as a user terminal (UE), can provide voices and/or data connectivity to users. For example, the terminal device may be a device having a wireless connection function, such as a handheld device, an on-board device, or the like. Mobile phones, tablet computers, laptop computers, handheld computers, mobile internet devices (MIDs), and wearable devices such as smart watches, smart bracelets, pedometers, and the like are common terminals.

In an example, the fingerprint TA sends the request for memory resources to the REE as follows. The fingerprint TA sends the request for memory resources to the REE via a preset interface.

Further, the preset interface is an interface of the fingerprint TA encapsulated in advance and used for the fingerprint TA to apply to the REE for memory resources.

Further, the preset interface may be a malloc function or other interfaces, and there is no limitation on the preset interface in the present disclosure. For software development, the malloc function is generally used for applying for memory. The fingerprint TA can apply to the REE for memory resources via the malloc function.

Further, each time the fingerprint TA applies for or releases memory resources, the fingerprint TA uses a global variable to record a value of all memory resources currently requested by the fingerprint TA. For example, if a value of memory resources requested at a first time point by the fingerprint TA is 50 MB, and at a second time point the fingerprint TA releases 10 MB of memory sources, then the fingerprint TA uses the global variable to record that the value of the memory resources requested at the second time point by the fingerprint TA is 40 MB.

Further, the global variable may be a numeral, for example, the value of the memory resources requested at the second time point is 40 MB. The global variable may also be a symbol, for example, aa, bb, or the like. Certainly, the global variable may be other indicator that can indicate the value of all memory resources currently requested by the fingerprint TA, and there is no limitation on the global variable in the present disclosure.

At block 102, the REE receives the request for memory resources from the fingerprint TA, and obtains N values of memory resources requested at N time points within a preset period by the fingerprint TA, where each of the N values of memory resources is in one-to-one correspondence with one of the N time points and N represents an integer larger than 1.

The preset period may be three days, one week, ten days, two weeks or other value for example. In addition, a value j of memory resources is a value of all memory resources requested at a time point J by the fingerprint TA, and the value j of memory resources is any of the N values of memory resources.

In an example, an interval between any two adjacent time points among the N time points equals a first threshold. The first threshold may be 1 hour, 3 hours, 5 hours, 6 hours, or other value for example.

In another example, the interval between any two adjacent time points among the N time points equals a second threshold. The second threshold is an integral number of a third threshold. For example, the third threshold may be 30 minutes, 40 minutes, 1 hour, 2 hours, 5 hours or other value for example. If the third threshold is 1 hour, then the second threshold may be 1 hour, 2 hours, 3 hours, 4 hours, 5 hours, or other value for example.

Further, the N time points may be defined by the REE, and also may be user-defined. There is no limitation on the manner in which the N time points are defined in the present disclosure.

In an example, before the REE obtains the N values of memory resources, the method illustrated in FIG. 1 further includes the following.

The REE transmits a cmd instruction to the fingerprint TA at a time point i, where the cmd instruction is used for querying a value I of memory resources requested at the time point i by the fingerprint TA, and the time point i is any of the N time points. The REE receives the value I of memory resources requested at the time point i by the fingerprint TA, where the value I of memory resources is transmitted to the REE by the fingerprint TA in response to the cmd instruction. The REE associates the value I of memory resources with the time point i.

For example, if the N time points are a first time point, a second time point, a third time point, a fourth time point, and a fifth time point, respectively, then the REE sends a first cmd instruction to the fingerprint TA at the first time point. After the fingerprint TA receives the first cmd instruction, the fingerprint TA sends a first value of memory resources currently requested by the fingerprint TA to the REE. After the REE receives the first value of memory resources, the REE associates the first time point with the first value of memory resources. The REE sends a second cmd instruction to the fingerprint TA at the second time point, and after the fingerprint TA receives the second cmd instruction, the fingerprint TA sends a second value of memory resources currently requested by the fingerprint TA to the REE. After the REE receives the second value of memory resources, the REE associates the second time point with the second value of memory resources. In such a way, the N values of memory resources are associated with the N time points, respectively. After this, when the REE receives the request for memory resources from the fingerprint TA, the REE can directly obtain the N values of memory resources from a memory space, where each of the N values of memory resources is associated with one of the N time points.

In an example, the fingerprint TA maintains the memory space. M values of memory resources are stored in the memory space, where each of the M values of memory resources is associated with one of M time points, and the M time points contain the N time points. The REE obtains the N values of memory resources as follows. The REE sends the cmd instruction to the fingerprint TA, where the N time points are contained in the cmd instruction, and the cmd instruction is used for querying the N values of memory resources. The REE receives the N values of memory resources from the fingerprint TA, where the N values of memory resources are sent to the REE by the fingerprint TA in response to the cmd instruction.

At block 103, the REE determines a target value of memory resources according to the N values of memory resources.

In an example, the REE determines the target value of memory resources according to the N values of memory resources as follows. The REE determines W values of memory resources from the N values of memory resources, where each of the W values of memory resources is smaller than or equal to a predetermined value. The REE determines a maximum value of memory resources among the W values of memory resources, and determines the target value of memory resources according to the maximum value of memory resources.

For example, the N values of memory resources include a first value of memory resources which is 50 MB, a second value of memory resources which is 60 MB, a third value of memory resources which is 40 MB, a fourth value of memory resources which is 30 MB, and a fifth value of memory resources which is 35 MB. If the REE can at most allocate 50 MB of memory resources for the fingerprint TA, when a value of memory resources requested at a certain time point by the fingerprint TA is larger than 50 MB, it indicates that the fingerprint TA may become abnormal. At this point the corresponding value of memory resources is abnormal, thus the W values of memory resources are the first value of memory resources which is 50 MB, the third value of memory resources which is 40 mb, the fourth value of memory resources which is 30 MB, and the fifth value of memory resources which is 35 MB, respectively, and the maximum value of memory resources among the four values of memory resources is 50 MB.

In an example, the REE determines the target value of memory resources according to the maximum value of memory resources as follows. When the maximum value of memory resources is larger than or equal to a preset threshold, the REE determines the preset threshold as the target value of memory resources. When the maximum value of memory resources is smaller than the preset threshold, the REE determines the maximum value of memory resources as the target value of memory resources.

The preset threshold is set by the REE in advance, and indicates a maximum value of memory resources that can be allocated for the fingerprint TA.

In an example, the REE determines the target value of memory resources according to the N values of memory resources as follows. The REE determines the W values of memory resources from the N values of memory resources, where each of the W values of memory resources is smaller than or equal to the predetermined value. The REE determines an average value of memory resources according to the W values of memory resources and determines the target value of memory resources according to the average value of memory resources.

In an example, the request for memory resources carries an identifier of an application K which needs to occupy memory resources. The REE determines the target value of memory resources according to the average value of memory resources as follows. When the average value of memory resources is larger than or equal to a preset value, or when a priority of the application K is higher than or equal to a preset priority and the average value of memory resources is smaller than the preset value, the REE determines the preset value as the target value of memory resources. In another example, when the priority of the application K is lower than the preset priority, and the average value of memory resources is smaller than the preset value, the REE determines the average value of memory resources as the target value of memory resources.

In an example, the preset value equals the preset threshold, is set by the REE in advance, and indicates the maximum value of memory resources that can be allocated for the fingerprint TA. Certainly, the preset value may be different from the preset threshold. There is no limitation on the preset value in the present disclosure.

At block 104, the REE allocates memory resources equal in value to the target value of memory resources for the fingerprint TA.

It can be seen that in the solution provided in the present disclosure, the REE does not randomly allocate memory resources for the fingerprint TA. Compared with the related art, the REE can flexibly allocate memory resources for the fingerprint TA, thereby increasing a utilization rate of resources.

Figure 2:
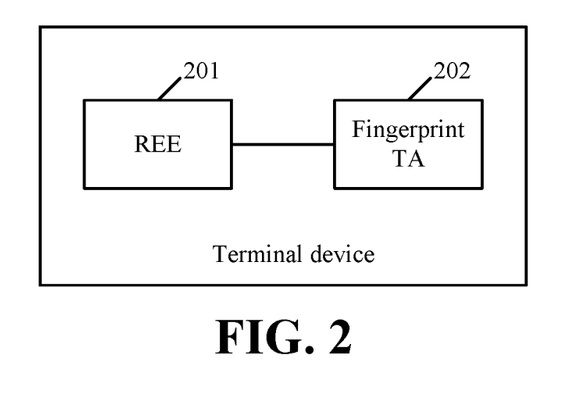
FIG. 2 is a schematic structural diagram illustrating a terminal device according to an implementation of the present disclosure.

According to an implementation of the present disclosure, a terminal device 200 is further provided. As illustrated in FIG. 2, the terminal device includes an REE 201 and a fingerprint TA 202.

The REE 201 is configured to obtain, in response to a request for memory resources sent by the fingerprint TA 202, N values of memory resources requested at N time points within a preset period by the fingerprint TA 202, where each of the N values of memory resources is in one-to-one correspondence with one of the N time points and N represents an integer larger than 1. The REE 201 is further configured to determine a target value of memory resources according to the N values of memory resources, and allocate memory resources equal in value to the target value of memory resources for the fingerprint TA 202.

In an example, the request for memory resources is sent by the fingerprint TA via a preset interface.

In an example, the preset interface is an interface of the fingerprint TA encapsulated in advance and used for the fingerprint TA to apply to the REE for memory resources.

In an example, each time the fingerprint TA applies for or releases memory resources, the fingerprint TA uses a global variable to record a value of all memory resources currently requested by the fingerprint TA.

In an example, the REE 201 is configured to determine W values of memory resources from the N values of memory resources, where each of the W values of memory resources is smaller than or equal to a predetermined value. The REE 201 is further configured to determine a maximum value of memory resources among the W values of memory resources, and determine the target value of memory resources according to the maximum value of memory resources.

In an example, the REE 201 is further configured to determine an average value of memory resources according to the W values of memory resources, and determine the target value of memory resources according to the average value of memory resources.

In an example, the REE 201 is configured to determine a preset threshold as the target maximum value of memory resources based on that the maximum value of memory resources is larger than or equal to the preset threshold, and determine the maximum value of memory resources as the target value of memory resources based on that the maximum value of memory resources is smaller than the preset threshold.

In an example, the preset threshold is set by the REE in advance, and indicates a maximum value of memory resources that can be allocated for the fingerprint TA.

In an example, the REE 201 is further configured to send a cmd instruction to the fingerprint TA at a time point i, where the cmd instruction is used for querying a value I of memory resources requested at the time point i by the fingerprint TA, and the time point i is any one of the N time points. The REE 201 is further configured to receive the value I of memory resources requested at the time point i by the fingerprint TA, where the value I of memory resources is sent to the REE by the fingerprint TA in response to the cmd instruction. The REE 201 is further configured to associate the value I of memory resources with the time point i.

What needs to be illustrated is that the above modules (the REE and the fingerprint TA) are configured to execute related operations of the above method.

In the implementation, the terminal device 200 is presented in the form of modules. The "modules" herein may include an application-specific integrated circuit (ASIC), a processor for executing one or more software or firmware programs and a memory, an integrated logic circuit, and/or other devices that can provide the above functions. In addition, the REE and the fingerprint TA can be implemented via a processor 301 of the terminal device illustrated in FIG. 3.

Figure 3:
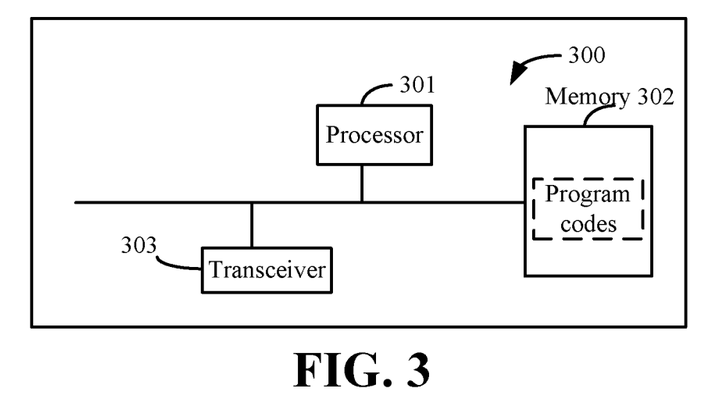
FIG. 3 is a schematic structural diagram illustrating a terminal device according to another implementation of the present disclosure.

As illustrated in FIG. 3, a terminal device 300 can be implemented via a structure illustrated in FIG. 3. The terminal device 300 includes at least one processor 301, at least one memory 302, and at least one communication interface 303. The processor 301 is coupled to the memory 302 and the communication interface 303 via communication buses, and mutual communication is realized via the communication buses.

The processor 301 may be a central processing unit (CPU), a microprocessor, an ASIC, or one or more integrated circuits for controlling program execution of the above solutions.

The communication interface 303 is configured to realize communication between the terminal device 300 and other devices or communication networks such as an Ethernet network, a radio access network (RAN), a wireless local area network (WLAN) and the like.

The memory 302 may be a read-only memory (ROM), other static storage device that can store static information and instructions, a random access memory (RAM), other dynamic storage device that can store dynamic information and instructions, an electrically erasable programmable read-only memory (EEPROM), a compact disc read-only memory (CD-ROM), other disc storage, disk storage (including a compressed disk, a laser disk, a disk, a digital general disk, a Blue-ray disk, and the like), a disc storage medium, other disc storage device, or any other medium that can carry or store desired program codes that present in the form of instructions or data structures and can be accessed by a computer. There is no limitation on the type of the memory. The memory may be an independent memory, and is coupled to the processor via the bus. The memory may also be integrated with the processor.

The memory 302 is configured to store program codes for performing the above solutions. The processor 301 controls the program codes to perform the above solutions. The processor 301 is configured to execute the program codes stored in the memory 302.

The codes stored in the memory can be executed to realize the above method for allocating memory resources executed by the terminal device. For example, in response to a request for memory resources sent by the fingerprint TA, the REE obtains N values of memory resources requested at N time points within a preset period by a fingerprint TA, where each of the N values of memory resources is in one-to-one correspondence with one of the N time points and N represents an integer larger than 1. The REE determines a target value of memory resources according to the N values of memory resources, and allocates memory resources equal in value to the target value of memory resources for the fingerprint TA.

Figure 4:
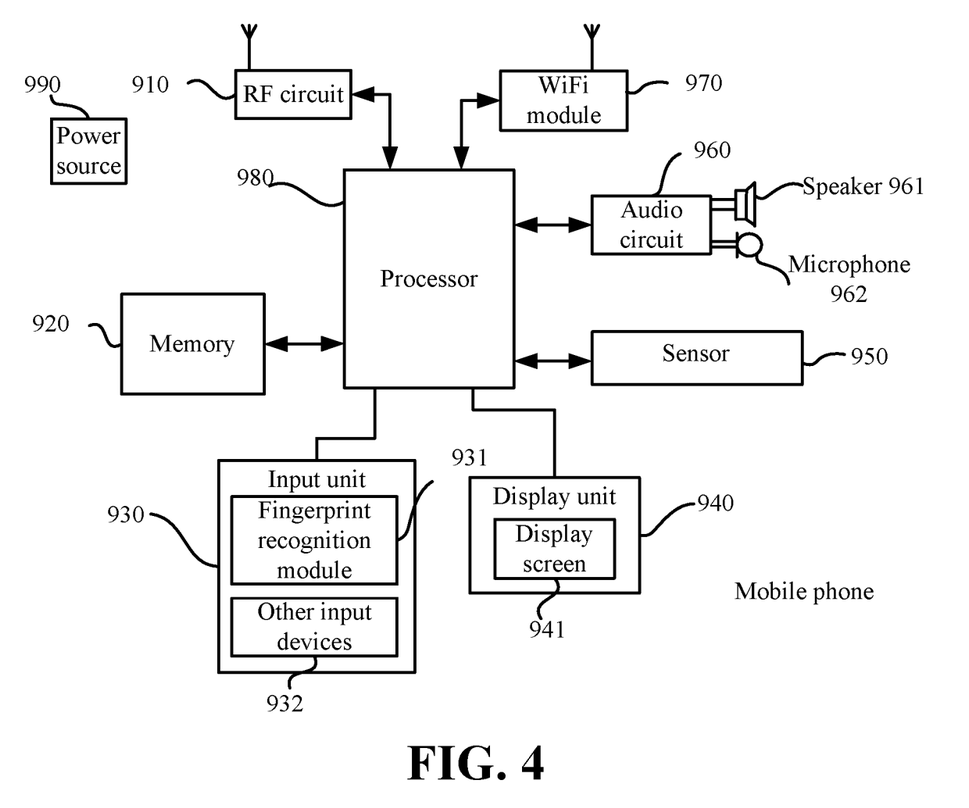
FIG. 4 is a schematic structural diagram illustrating a terminal device according to yet another implementation of the present disclosure.

Implementations of the present disclosure further provides another mobile terminal. As illustrated in FIG. 4, for simple illustration, only parts related to the implementations of the present disclosure are illustrated, and details are not disclosed. For details, reference may be made to the method implementation of the present disclosure. The mobile terminal may be a mobile phone, a tablet computer, a personal digital assistant (PDA), a point of sales (POS), an on-board computer, or the like. The following describes a mobile phone as an example of the mobile terminal.

FIG. 4 is a block diagram illustrating a part of a structure of a mobile phone related to a mobile terminal according to an implementation of the present disclosure. With reference to FIG. 4, the mobile phone may include a radio frequency (RF) circuit 910, a memory 920, an input unit 930, a display unit 940, a sensor 950, an audio circuit 960, a wireless fidelity (Wi-Fi) module 970, a processor 980, a power supply 990, and so on. Those skilled in the art can understand that the structure of the mobile phone illustrated in FIG. 4 does not constitute any limitation on a mobile phone. The mobile phone may include more or fewer components than illustrated, some components may be combined, or the mobile phone may include different component arrangements.

The following will specifically illustrate various components of the mobile phone in combination with FIG. 4.

The RF circuit 910 is configured to receive and transmit information. Generally, the RF circuit 910 includes, but is not limited to, an antenna, at least one amplifier, a transceiver, a coupler, a low noise amplifier (LNA), a duplexer and the like. In addition, the RF circuit 910 may also communicate with network and other devices by wireless communication. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS) and so on.

The memory 920 is configured to store software programs and modules. The processor 980 is configured to execute various function applications and data processing for the mobile phone by running the software programs and the modules stored in the memory 920. The memory 920 mainly includes a program storage area and a data storage area. The program storage area may store an operating system, application programs required for at least one function and so on. The data storage area may store data created according to use of the mobile phone (for example, N values of memory resources), and so on. In addition, the memory 920 may include a high-speed RAM, and may further include a non-volatile memory such as at least one disk storage device, a flash device, or other non-volatile solid storage devices.

The input unit 930 may be configured to receive input digital or character information and generate key signal input associated with user setting and function control of the mobile phone. In an example, the input unit 930 may include a fingerprint sensor 931 and other input devices 932. The fingerprint sensor 931 can collect data of user's fingerprint thereon. In addition to the fingerprint sensor 931, the input unit 930 may further include other input devices 932. In an example, the other input devices 932 may include, but is not limited to, one or more of a touch screen, a physical keyboard, function keys (such as volume control buttons, switch buttons and so on), a trackball, a mouse, and a joystick.

The display unit 940 is configured to display information input in response to the user's operation or information provided for the user or various menus of the mobile phone. The display unit 940 may include a display screen 941, and alternatively, the display screen 941 may be in the form of a liquid crystal display (LCD), an organic light-emitting diode (OLED) and so on. Although in FIG. 4, the fingerprint sensor 931 and the display screen 941 are used as two separate components to realize input and output functions of the mobile terminal, in some implementations, the fingerprint sensor 931 may be integrated with the display screen 941 to realize input and playback functions of the mobile phone.

The mobile phone may also include at least one sensor 950, such as a light sensor, a motion sensor, and other sensors. In an example, the light sensor may include an ambient light sensor and a proximity sensor. The ambient light sensor may adjust the brightness of the display screen 941 according to the brightness of ambient lights. The proximity sensor may turn off the display screen 941 and/or backlight when the mobile phone reaches nearby the ear. As a kind of motion sensor, the accelerometer sensor can detect the magnitude of acceleration in all directions (typically three axes) and when the mobile phone is stationary, the accelerometer sensor can detect the magnitude and direction of gravity. The accelerometer sensor can also identify mobile-phone gestures related applications (such as vertical and horizontal screen switch, related games, magnetometer attitude calibration), or the accelerometer sensor can be used for vibration-recognition related functions (such as a pedometer, percussion) and so on. The mobile phone can also be equipped with a gyro-sensor, a voltage detector, a humidity detector, a temperature detector, an infrared sensor and other sensors, and details are not repeated herein.

The audio circuit 960, the speaker 961, the microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals to output. On the other hand, the microphone 962 converts the received sound signals into electrical signals, which will be received and converted into audio data by the audio circuit 960 to output. The audio data is then processed and transmitted by the processor 980 via the RF circuit 910 to another mobile phone for example, or, the audio data is output to the memory 920 for further processing.

Wi-Fi belongs to a short-distance wireless transmission technology. With aid of the Wi-Fi module 970, the mobile phone may assist the user in E-mail receiving and sending, webpage browsing, access to streaming media and the like. Wi-Fi provides the user with wireless broadband Internet access. Although the Wi-Fi module 970 is illustrated in FIG. 4, the Wi-Fi module 970 is not essential to the mobile phone and can be omitted according to actual needs without departing from the essential nature of the present disclosure.

The processor 980 is the control center of the mobile phone. The processor 980 is coupled to various parts of the whole mobile phone through various interfaces and lines, runs or executes software programs and/or modules stored in the memory 920, and invokes data stored in the memory 920 to perform various functions of the mobile phone and process data, thereby monitoring the mobile phone as a whole. Optionally, the processor 980 may include one or more processing units. For example, for the processor 980, an application processor may be integrated with a modem processor, where the application processor handles the operating system, user interfaces, applications, and so on, and the modem processor mainly processes wireless communication. It can be understood that the above-mentioned modem processor may not be integrated into the processor 980.

The mobile phone may also include the power supply 990 (e.g., a battery) that supplies power to various components. Preferably, the power supply may be logically connected to the processor 980 via a power management system to enable management of charging, discharging, and power consumption through the power management system.

Although not illustrated, the mobile phone may further include a camera, a Bluetooth module, and so on, and details are not repeated herein.

In the above implementation illustrated in FIG. 1, method processes in various steps may be realized based on the structure of the mobile phone.

In the above implementation illustrated in FIG. 2, functions of various units may be realized based on the structure of the mobile phone.

Implementations of the present disclosure also provide a computer storage medium. The computer storage medium stores computer programs. The computer programs are operable to implement a part of or all operations of any of the above methods for allocating memory resources recorded in the above method implementations.

It is to be noted that, for the sake of simplicity, the foregoing method implementations are described as a series of action combinations, however, it will be appreciated by those skilled in the art that the sequence of actions described may not be construed as limitation on the present disclosure. According to the present disclosure, certain operations may be performed in other order or simultaneously. Besides, it will be appreciated by those skilled in the art that the implementations described in the specification are example embodiments and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it can be understood that the apparatus disclosed in implementations provided herein may be implemented in other manners. For example, the device/apparatus implementations described above are merely illustrative; for instance, the division of the units is only a logical function division and there can be other division manners during actual implementations. For example, multiple units or components may be combined or may be integrated into another system, or some features may be ignored, omitted, or not performed. In addition, coupling or direct coupling or communication connection among illustrated or discussed components may be indirect coupling or communication connection among devices or units via some interfaces, and may be electrical connection, or other forms of connection.

The units described as separate components may or may not be physically separated. The components illustrated as units may or may not be physical units, that is, they may be in the same place or may be distributed to multiple network units. All or part of the units may be selected according to actual needs to achieve the technical solutions of the embodiments.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions operable with a computer device (which may be a personal computer, a server, or a network device and so on) to perform all or part of the operations described in the various implementations of the present disclosure. The memory includes various medium capable of storing program codes, such as a universal serial bus (USB) flash disk, a ROM, a RAM, a movable hard disk, a disk, a compact disc (CD), and the like.

It will be understood by those ordinarily skilled in the art that all or a part of operations of the various methods of the implementations described above may be accomplished by means of a program to instruct associated hardware. The program may be stored in a computer-readable memory, which may include a flash memory, a ROM, a RAM, a disk or a CD, and so on.

The above illustrates the implementations of the present disclosure in detail. The specification employs specific examples to illustrate the principle and implementation manners of the present disclosure. The illustration of the above implementations is just used to help in understanding of the method and core concept of the present disclosure. For a person ordinarily skilled in the art, according to the concept of the present disclosure, changes may be made on the specific implementations and application range. In conclusion, the content of the specification shall not be understood to limit the present disclosure.

What is claimed is:

1. A method for allocating memory resources, the method being applied to a terminal device, the terminal device comprising a rich execution environment (REE) and a fingerprint trust application (TA), and the method comprising:

obtaining, by the REE, N values of memory resources requested at N time points within a preset period by the fingerprint TA in response to a request for memory resources sent by the fingerprint TA, wherein each of the N values of memory resources is in one-to-one correspondence with one of the N time points and N represents an integer larger than 1;

determining, by the REE, a target value of memory resources according to the N values of memory resources; and allocating, by the REE, memory resources equal in value to the target value of memory resources for the fingerprint TA.

2. The method of claim 1, wherein the request for memory resources is sent by the fingerprint TA via a preset interface.

3. The method of claim 2, wherein the preset interface is an interface of the fingerprint TA encapsulated in advance and used for the fingerprint TA to apply to the REE for memory resources.

4. The method of claim 1, wherein each time the fingerprint TA applies for or releases memory resources, the fingerprint TA uses a global variable to record a value of all memory resources currently requested by the fingerprint TA.

5. The method of claim 1, wherein determining, by the REE, the target value of memory resources according to the N values of memory resources comprises:

determining, by the REE, W values of memory resources from the N values of memory resources, wherein each of the W values of memory resources is smaller than or equal to a predetermined value;

determining, by the REE, a maximum value of memory resources among the W values of memory resources; and determining, by the REE, the target value of memory resources according to the maximum value of memory resources.

6. The method of claim 5, wherein determining, by the REE, the target value of memory resources according to the maximum value of memory resources comprises:
determining, by the REE, a preset threshold as the target value of memory resources based on that the maximum value of memory resources is larger than or equal to the preset threshold; and
determining, by the REE, the maximum value of memory resources as the target value of memory resources based on that the maximum value of memory resources is smaller than the preset threshold.

7. The method of claim 6, wherein the preset threshold is set by the REE in advance, and indicates a maximum value of memory resources that is able to be allocated for the fingerprint TA.

8. The method of claim 1, wherein determining, by the REE, the target value of memory resources according to the N values of memory resources comprises:
determining, by the REE, W values of memory resources from the N values of memory resources, wherein each of the W values of memory resources is smaller than or equal to a predetermined value;
determining, by the REE, an average value of memory resources according to the W values of memory resources; and
determining, by the REE, the target value of memory resources according to the average value of memory resources.

9. The method of claim 8, wherein determining, by the REE, the target value of memory resources according to the average value of memory resources comprises:
determining, by the REE, a preset threshold as the target value of memory resources based on that an application has a priority higher than or equal to a preset priority and the average value of memory resources is smaller than the preset threshold, wherein an identifier of the application is contained in the request for memory resources; and
determining, by the REE, the average value of memory resources as the target value of memory resources based on that the priority of the application is lower than the preset priority and the average value of memory resources is smaller than the preset threshold.

10. The method of claim 1, further comprising:
sending, by the REE, a cmd instruction to the fingerprint TA at a time point i, wherein the cmd instruction is used for querying a value I of memory resources requested at the time point i by the fingerprint TA, and the time point i is one of the N time points;
receiving, by the REE, the value I of memory resources requested at the time point i by the fingerprint TA, wherein the value I of memory resources is sent to the REE by the fingerprint TA in response to the cmd instruction; and
associating the value I of memory resources with the time point i.

11. A terminal device comprising a processor, a rich execution environment (REE), and a fingerprint trust application (TA), the processor is configured to operate with the REE to:
obtain N values of memory resources requested at N time points within a preset period by the fingerprint TA in response to a request for memory resources sent by the fingerprint TA, wherein each of the N values of memory resources is in one-to-one correspondence with one of the N time points and N represent an integer larger than 1;
determine a target value of memory resources according to the N values of memory resources; and
allocate memory resources equal in value to the target value of memory resources for the fingerprint TA.

12. The terminal device of claim 11, wherein the request for memory resources is sent by the fingerprint TA via a preset interface.

13. The terminal device of claim 12, wherein the preset interface is an interface of the fingerprint TA encapsulated in advance and used for the fingerprint TA to apply to the REE for memory resources.

14. The terminal device of claim 11, wherein each time the fingerprint TA applies for or releases memory resources, the fingerprint TA uses a global variable to record a value of all memory resources currently requested by the fingerprint TA.

15. The terminal device of claim 11, wherein the processor configured to operate with the REE to determine the target value of memory resources according to the N values of memory resources is configured to operate with the REE to:
determine W values of memory resources from the N values of memory resources, wherein each of the W values of memory resources is smaller than or equal to a predetermined value;
determine a maximum value of memory resources among the W values of memory resources; and
determine the target value of memory resources according to the maximum value of memory resources.

16. The terminal device of claim 15, wherein the processor configured to operate with the REE to determine the target value of memory resources according to the maximum value of memory resources is configured to operate with the REE to:
determine a preset threshold as the target value of memory resources based on that the maximum value of memory resources is larger than or equal to the preset threshold; and
determine the maximum value of memory resources as the target value of memory resources based on that the maximum value of memory resources is smaller than the preset threshold.

17. The terminal device of claim 11, wherein the processor configured to operate with the REE to determine the target value of memory resources according to the N values of memory resources is configured to operate with the REE to:
determine W values of memory resources from the N values of memory resources, wherein each of the W values of memory resources is smaller than or equal to a predetermined value;
determine an average value of memory resources according to the W values of memory resources; and
determine the target value of memory resources according to the average value of memory resources.

18. The terminal device of claim 17, wherein the processor configured to operate with the REE to determine the target value of memory resources according to the average value of memory resources is configured to operate with the REE to:
determine, by the REE, a preset threshold as the target value of memory resources based on that an application has a priority higher than or equal to a preset priority and the average value of memory resources is smaller than the preset threshold, wherein an identifier of the application is contained in the request for memory resources; and determine, by the REE, the average value of memory resources as the target value of memory resources based on that the priority of the application is lower than the preset priority and the average value of memory resources is smaller than the preset threshold.

19. The terminal device of claim 11, wherein the processor is further configured to operate with the REE to:

send a cmd instruction to the fingerprint TA at a time point i, wherein the cmd instruction is used for querying a value I of memory resources requested at the time point i by the fingerprint TA, and the time point i is one of the N time points;

receive the value I of memory resources requested at the time point i by the fingerprint TA, wherein the value I of memory resources is sent to the REE by the fingerprint TA in response to the cmd instruction; and associate the value I of memory resources with the time point i.

20. A non-transitory computer-readable storage medium, being configured to store one or more computer programs, and the one or more computer programs, when executed, being operable with a terminal device comprising a rich execution environment (REE) and a fingerprint trust application (TA) to:

obtain, by the REE, N values of memory resources requested at N time points within a preset period by the fingerprint TA in response to a request for memory resources sent by the fingerprint TA, wherein each of the N values is in one-to-one correspondence with one of the N time points and N represents an integer larger than 1;

determine, by the REE, a target value of memory resources according to the N values of memory resources; and allocate, by the REE, memory resources equal in value to the target value of memory resources for the fingerprint TA.

* * * * *